Figure 1:
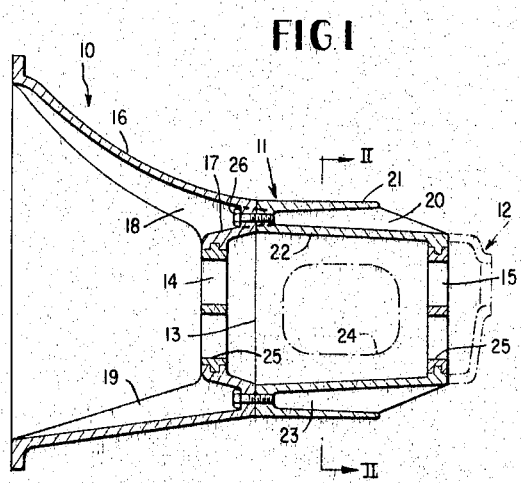

Aug. 2, 1966 J. MÜLLER 3,263,521

TRANSMISSION HOUSING

Filed Jan. 28, 1963

INVENTOR.
JOSEF MÜLLER
BY
*Dicke & Craig*
ATTORNEYS

United States Patent Office 3,263,521
Patented August 2, 1966

3,263,521
TRANSMISSION HOUSING
Josef Müller, Stuttgart-Riedenberg, Germany, assignor to Daimler-Benz Aktiengesellschaft, Stuttgart-Unterturkheim, Germany
Filed Jan. 28, 1963, Ser. No. 254,312
Claims priority, application Germany, Jan. 31, 1962,
D 38,035
19 Claims. (Cl. 74—606)

The present invention relates to a housing consisting of a light metal for gear transmissions, especially for change-speed transmissions of motor vehicles, whereby the transmisson shafts disposed parallel to each other are disposed in the housing longitudinal direction and are supported in the housing end walls.

Housings made of light metal are known, per se, in the prior art. Such housings have the advantage in the transmission construction of being of relatively light weight, however, have unfortunately also the disadvantage that by reasons of the relatively large modulus of elasticity of the light metals are less sturdy and rigid. As a result thereof there occur at times in such light weight housing constructions very disturbing gear-wheel noises during the operation of the transmision.

The present invention aims at eliminating these disadvantages. The present invention solves the underlying problems with the transmission housings of the type mentioned hereinabove by making the housing of double-wall construction at least over ¾ of the length thereof, by arranging longitudinal ribs between the outer and inner walls of the housing, and by providing hollow spaces disposed between the longitudinal ribs and the outer and inner walls which are open at least in the direction toward one housing end face thereof.

Such a considerable reinforcement of the housing is achieved with the construction in accordance with the present invention that the disturbing noises are eliminated. An increase in weight does not occur for all practical purposes as the individual walls may be of somewhat thinner construction. By reason of its particular construction the housing in accordance with the present invention may be readily manufactured by the die-casting process so that also the manufacture thereof is rendered less expensive.

Double-walled transmission housings are known with track-laying vehicles, however, such constructions involve a cooling jacket closed in itself which is placed about the entire housing. Consequently, both the purpose as well as the construction of such prior art double-wall housing construction are completely different from the present invention, and the known housing with the closed cooling jacket cannot be made in the die-casting process.

In one construction according to the present invention, the outer walls extend approximately over ¾ of the housing length whereas the longitudinal ribs extend over the entire housing length. The longitudinal ribs may thereby extend at an inclination from the end of the outer walls to the housing end face. Also, the cover for the shifting aperture may be of double-walled construction. In general, outer and inner walls, especially as viewed in cross section, extend parallel to each other.

However, it may also be appropriate if the inner walls follow or conform as closely as possible to the contour of the gear wheels. A further reinforcement results from such an arrangement on the side opposite the housing cover by the strongly curved wall parts so that even the absence of the double-walled construction at the cover and at the cover side of the housing—which is disposed within the area of the invention—is compensated for. The outer walls may also be provided with recesses or indentations which extend in the longitudinal direction and in particular may be constructed of undulated shape.

The housing construction in accordance with the present invention is intended primarily for motor-vehicle change-speed transmissions which are flangedly connected in the usual manner with the housing thereof at a bell-shaped clutch housing accommodating the main clutch. In that case, the present invention proposes to include the bell-shaped clutch housing at least in part in the double-walled construction. The separating joint, extending perpendicular to the axis, between the bell-shaped clutch housing and the transmission housing is thereby displaced into the area of the transmission and the forward end wall of the transmission housing as well as its forward part is formed by the bell-shaped clutch housing itself.

With such a construction the housing part formed by the bell-shaped clutch housing is also appropriately of double-wall construction. The longitudinal ribs extend thereby on the inside and again extend up to the aperture of the bell-shaped clutch housing or up to within proximity thereof. Both parts are kept together by bolts or screws which are accessible, as also the fitting pins or guide means, through the hollow spaces between the ribs either from the transmission side or from the inside of the bell-shaped clutch housing. The bolts and the fitting pins may also be arranged outside of the outer wall preferably in recesses thereof.

Two housing parts that may be manufactured extremely readily in the die-casting process result from such an arrangement. Additionally, the assembly of the transmission may take place from the open end face thereof so that the size of the lateral aperture has to be designed only in accordance with the requirements of the shifting mechanism.

It is also feasible in accordance with the present invention to construct the wall parts forming the bearing seats as gray-cast parts and to cast the same into the end walls of the light metal housing. Additionally, the sound-proofing or sound-damping may be further improved by filling the hollow spaces with a sound-damping material.

Accordingly, it is an object of the present invention to provide a light metal housing for change-speed transmissions which, by simple means, effectively eliminates the disadvantages and shortcomings of the prior art constructions.

It is another object of the present invention to provide a double-walled light-weight housing for change-speed transmissions which effectively eliminates any disturbing noises produced by the meshing gears.

A still further object of the present invention resides in the provision of a light-weight transmission housing which is sufficiently reinforced yet may be readily manufactured, by simple means, for example, by the die-casting process.

Still another object of the present invention resides in the provision of a double-walled transmission housing, especially for change-speed gears of motor vehicles, in which the inner and outer walls may be made of relatively lesser wall thickness than a transmission housing made of a single wall construction of similar material so that practically no increase in weight has to be accepted with the use of a double-walled construction.

Still another object of the present invention resides in the provision of a transmission housing which together with the bell-shaped clutch housing is sub-divided in such a manner that it may be readily assembled and disassembled and the connecting means are readily acessible during assembly and disassembly.

Another object of the present invention resides in the provision of a transmission housing of double-walled construction and made of light-weight metals which not only offers sufficient rigidity but also may be sound-proofed by filling the hollow spaces between the two walls with a sound-proofing material.

Figure 2:
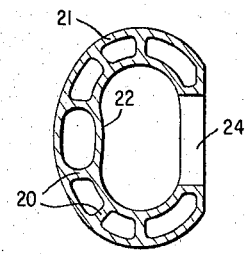
Figure 3:
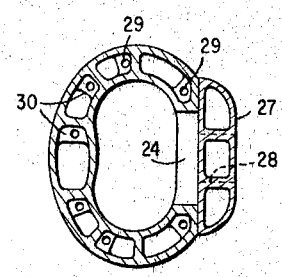
Figure 4:
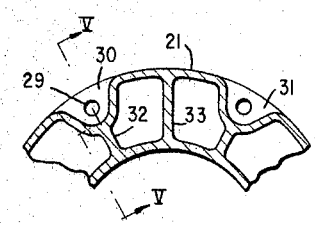
Figure 5:
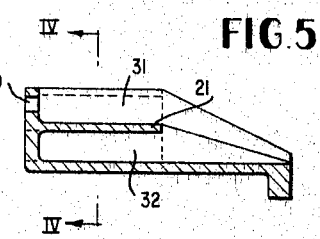
Figure 6:
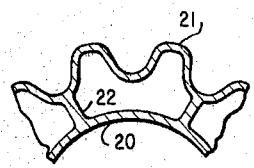

These and other objects, features and advantages of the present invention will become more obvious from the following description when taken in connection with the accompanying drawing which shows, for purposes of illustration only, several embodiments in accordance with the present invention, and wherein FIGURE 1 is a longitudinal axial cross-sectional view through a transmission housing in accordance with the present invention, FIGURE 2 is a cross-sectional view taken along line II—II of FIGURE 1, FIGURE 3 is a cross-sectional view, similar to FIGURE 2, of a modified embodiment of a transmission housing in accordance with the present invention, FIGURE 4 is a partial cross-sectional view, on an enlarged scale, of a still further modified embodiment of a transmission housing in accordance with the present invention, FIGURE 5 is a cross-sectional view taken along line V—V of FIGURE 4, and FIGURE 6 is a partial cross-sectional view, similar to FIGURE 4 of a still further modified embodiment of a housing in accordance with the present invention.

Referring now to the drawing wherein like reference numerals are used throughout the various views to designate like parts, and more particularly to FIGURES 1 and 2, reference numeral 10 generally designates therein a bell-shaped clutch housing to which is connected a transmission housing generally designated by reference numeral 11 and made of light metal. The transmission housing is closed off toward the rear by a cover generally designated by reference numeral 12 and not illustrated in detail herein. The term "light metal" is used herein to designate, as usual in this art, the known relatively light-weight metals and alloys thereof such as, for example, aluminum, magnesium, and other known lightweight metals as well as the alloys thereof. The separating joint 13 between the transmision housing 11 and the bell-shaped clutch housing 10 is displaced into the forward area of the transmission, that is, in other words, the forward end wall 14 of the transmission housing 10 is formed by the bell-shaped clutch housing 10. The bell-shaped clutch housing 10 is, for that purpose, extended beyond the forward end wall 14 in the direction toward the rear end wall 15 of the transmission so that between the outer walls 16 and the inner walls 17 pockets 18 are formed which are open at least in the direction toward the driving or input side. Ribs 19 extend from the end wall 14 and taper off in the direction toward the aperture of the bell-shaped clutch housing 10. The ribs 19 additionally reinforce the bell-shaped clutch housing 10.

The transmission housing 11, properly speaking, is of double-walled construction approximately over ¾ of its length. For that purpose, the transmission housing 11 is provided with radially or approximately radially extending ribs 20 which are surrounded by an outer wall 21. The outer and inner walls 21 and 22 extend substantially parallelly to each other; however, it is appropriate if the inner walls 22, as shown in FIGURE 2, follow or conform as closely as possible to the contour of the gear wheels in the transmission. A further reinforcement is achieved thereby so that elimination of the double-walled construction on the housing side containing the aperture 24 is compensated for.

Pockets 23 are formed between the outer wall 21 and inner wall 22 which are open at least in the direction toward the rear end wall 15 and may possibly be sprayed with a sound-damping material. The pockets 18 and 23 may also be open on both sides thereof so that, as indicated in dash lines in FIGURE 1, the pockets 18 and 23 pass over one into the other. The ribs 20 extend at an inclination from the end of the outer wall 21 toward the transmission end wall 15. The walls and ribs may be made somewhat thinner than would be feasible with a single-walled housing. Gray-cast parts 25 may be cast into the two end walls 14 and 15 for the bearing support of the transmission shafts.

The assembly of the transmisison shafts take place in the housing according to the present invention from the side facing the bell-shaped clutch housing 10. Subsequent thereto, the transmission housing 11 including the assembled transmission is brought together with the bell-shaped clutch housing 10 and is secured thereat by means of bolts 26 or the like. The bolts 26 and the additionally present fitting or guide pins (not shown) are readily accessible through the pockets 18 from the inside of the bell-shaped clutch housing 10. It is also within the scope of the present invention to insert the same from the outside through the hollow spaces 23.

In the embodiment of FIGURE 3, the aperture 24 is closed by a cover 27 which is also of double-walled construction. The construction of the double-walled cover 27 is the same in principle as that of the housing 10. The cover 27, of course, has one or several apertures 28 for the shifting members. The pockets 23 are open at the housing toward both sides. The bores 29 for the bolts are disposed within lobes or flange portions 30 of the end wall.

In the arrangement according to FIGURES 4 and 5, the outer wall 21 is provided with recesses 31 which extend in the longitudinal direction. These recesses 31 pass over at the bottom into more shallow ribs 32. Higher ribs 33 may be disposed therebetween. The bolt bores 29 are disposed in this embodiment outside of the outer wall within the recesses 31. A flange-like closure may be provided in the separating joint 13 or, if the pockets 23 are open toward both sides, as indicated in dash lines in FIGURE 3, only lobes or lips 30 are present for the bolt bores 29.

FIGURE 6 illustrates an outer wall 21 constructed of undulated shape which, in the manner described already hereinabove is connected by ribs 20 at each or at least at some of the undulations with the inner wall 22. As to the rest, the construction of this embodiment may be the same as any one of the preceding embodiments.

While I have shown and described several embodiments in accordance with the present invention, it is understood that the same is not limited thereto but is susceptible of numerous changes and modifications within the spirit and scope thereof, and I therefore do not wish to be limited to the details shown and described herein, but intend to cover all such changes and modifications as are encompassed by the scope of the appended claims.

I claim:

1. A housing made of light metal for gear transmissions, especially for change-speed transmissions of motor vehicles of the type in which the transmission shafts extending substantially parallel to each other are disposed in the longitudinal direction of the housing and are supported in housing end walls, comprising:

inner and outer wall means forming a double-walled housing construction over at least three-quarters the length of the housing, longitudinal rib means arranged between the outer and inner wall means, the hollow spaces disposed between the longitudinal rib means and the outer and inner wall means being open at least toward one housing end face, and a bell-shaped clutch housing flangedly connected to said first-named housing and including an outer wall.

2. A housing made of light metal for gear transmissions, especially for change-speed transmissions of motor vehicles of the type in which the transmission shafts extending substantially parallel to each other are disposed in the longitudinal direction of the housing and are supported in housing end walls, comprising:

inner and outer wall means forming a double-walled housing construction over at least three-quarters the length of the housing, longitudinal rib means arranged between the outer and inner wall means, the hollow spaces disposed between the longitudinal rib means and the outer and inner wall means being open at least toward one housing end face, and the outer wall means extending over about ¾ of the housing length while the longitudinal rib means extend over substantially the entire housing length and comprise a portion inclined from the end of the outer wall means to the respective housing end wall.

3. A housing made of light metal for gear transmissions, especially for change-speed transmissions of motor vehicles of the type in which the transmission shafts extending substantially parallel to each other are disposed in the longitudinal direction of the housing and are supported in housing end walls, comprising:

inner and outer wall means forming a double-walled housing construction over at least three-quarters the length of the housing, said housing being provided with an aperture on one side thereof and being of double-walled construction exclusive said one side, longitudinal rib means arranged between the outer and inner wall means, the hollow spaces disposed between the longitudinal rib means and the outer and inner wall means being open at least toward one housing end face, and the outer wall means extending over about ¾ of the housing length while the longitudinal rib means extend over substantially the entire housing length and comprise a portion inclined from the end of the outer wall means to the respective housing end wall.

4. A housing made of light metal for gear transmissions, especially for change-speed transmissions of motor vehicles of the type in which the transmission shafts extending substantially parallel to each other are disposed in the longitudinal direction of the housing and are supported in housing end walls, comprising:

inner and outer wall means forming a double-walled housing construction over at least three-quarters the length of the housing, said housing being provided with an aperture on one side thereof and being of double-walled construction exclusive said one side, longitudinal rib means arranged between the outer and inner wall means, the hollow spaces disposed between the longitudinal rib means, and the outer wall means extending over about ¾ of the housing length while the longitudinal rib means extend over substantially the entire housing length and comprise a portion inclined from the end of the outer wall means to the respective housing end wall.

5. A housing made of light metal for gear transmissions, especially for change-speed transmissions of motor vehicles of the type in which the transmission shafts extending substantially parallel to each other are disposed in the longitudinal direction of the housing and are supported in housing end walls, comprising:

inner and outer wall means forming a double-walled housing construction over at least three-quarters the length of the housing, longitudinal rib means arranged between the outer and inner wall means, said housing being provided with an aperture on one side thereof and cover means also of double-walled construction for said aperture, the hollow spaces disposed between the longitudinal rib means and the outer and inner wall means being open at least toward one housing end face, and the outer wall means extending over about ¾ of the housing length while the longitudinal rib means extend over substantially the entire housing length and comprise a portion inclined from the end of the outer wall means to the respective housing end wall.

6. A housing made of light metal for gear transmissions, especially for change-speed transmissions of motor vehicles of the type in which the transmission shafts extending substantially parallel to each other are disposed in the longitudinal direction of the housing and are supported in housing end walls, comprising:

inner and outer wall means forming a double-walled housing construction over at least three-quarters the length of the housing, longitudinal rib means arranged between the outer and inner wall means, the hollow spaces disposed between the longitudinal rib means and the outer and inner wall means being open at least toward one housing end face, the outer wall means being provided with recesses extending in the longitudinal direction and being of approximately undulated shape, and the outer wall means extending over about ¾ of the housing length while the longitudinal rib means extend over substantially the entire housing length and comprise a portion inclined from the end of the outer wall means to the respective housing end wall.

7. A housing made of light metal for gear transmissions, comprising:

inner and outer wall means forming a double-walled housing construction over at least three-quarters the length of the housing, said housing being provided with an aperture on one side thereof and being of double-walled construction exclusive said one side, longitudinal rib means arranged between the outer and inner wall means, the hollow spaces disposed between the longitudinal rib means and the outer and inner wall means being open at least toward one housing end face.

8. A housing made of light metal for gear transmissions, comprising:

inner and outer wall means forming a double-walled housing construction over at least three-quarters the length of the housing, longitudinal rib means arranged between the outer and inner wall means, the hollow spaces disposed between the longitudinal rib means and the outer and inner wall means being open at least toward one housing end face, the outer wall means being provided with recesses extending in the longitudinal direction, and a further housing fastened by bolt means at the other end face of said first-named housing, said recesses accommodating said bolt means.

9. A housing made of light metal for gear transmissions, especially for change-speed transmissions of motor vehicles of the type in which the transmission shafts extending substantially parallel to each other are disposed in the longitudinal direction of the housing and are supported in housing end walls, comprising:

inner and outer wall means forming a double-walled transmission housing construction over at least three-quarters the length of the housing, longitudinal rib means arranged between the outer and inner wall means, the hollow spaces disposed between the longitudinal rib means and the outer and inner wall means being open in the direction toward at least one housing end face, and a bell-shaped clutch housing flangedly connected to the transmission housing and including an outer wall, the separating joint, extending substantially perpendicularly to the longitudinal direction, between the transmission housing and the clutch housing being displaced into the area of the transmission, and the forward end wall of the transmission housing as well as the forward portion thereof being formed by the clutch housing itself.

10. A housing made of light metal for gear transmissions, especially for change-speed transmissions of motor vehicles of the type in which the transmission shafts extending substantially parallel to each other are disposed in the longitudinal direction of the housing and are supported in housing end walls, comprising:

inner and outer wall means forming a double-walled transmission housing construction over at least three-quarters the length of the housing, longitudinal rib means arranged between the outer and inner wall means, the hollow spaces disposed between the longitudinal rib means and the outer and inner wall means being open in the direction toward at least one housing end face, and a bell-shaped clutch housing flangedly connected to the transmission housing and including an outer wall, the separating joint, extending substantially perpendicularly to the longitudinal direction, between the transmission housing and the clutch housing being displaced into the area of the transmission, and the forward end wall of the transmission housing as well as the forward portion thereof being formed by the clutch housing itself, the forward housing part formed by said bell-shaped clutch housing being also of double-walled construction and including longitudinal rib means extending from the forward end wall to the outer wall thereof.

11. A housing made of light metal for gear transmissions, especially for change-speed transmissions of motor vehicles of the type in which the transmission shafts extending substantially parallel to each other are disposed in the longitudinal direction of the housing and are supported in housing end walls, comprising:

inner and outer wall means forming a double-walled transmission housing construction over at least three-quarters the length of the housing, longitudinal rib means arranged between the outer and inner wall means, the hollow spaces disposed between the longitudinal rib means and the outer and inner wall means being open in the direction toward at least one housing end face, and a bell-shaped clutch housing flangedly connected to the transmission housing and including an outer wall, the separating joint, extending substantially perpendicularly to the longitudinal direction, between the transmission housing and the clutch housing being displaced into the area of the transmission, and the forward end wall of the transmission housing as well as the forward portion thereof being formed by the clutch housing itself, the forward housing part formed by said bell-shaped clutch housing being also of double-walled construction and including longitudinal rib means extending from the forward end wall to the outer wall thereof, and connecting means for detachable connecting said clutch housing to the transmission housing and being accessible through the hollow spaces of at least some of said longitudinal rib means.

12. A housing made of light metal for gear transmissions, especially for change-speed transmissions of motor vehicles of the type in which the transmission shafts extending substantially parallel to each other are disposed in the longitudinal direction of the housing and are supported in housing end walls, comprising:

inner and outer wall means forming a double-walled transmission housing construction over at least three-quarters the length of the housing, longitudinal rib means arranged between the outer and inner wall means, the hollow spaces disposed between the longitudinal rib means and the outer and inner wall means being open in the direction toward at least one housing end face, and a bell-shaped clutch housing flangedly connected to the transmission housing and including an outer wall, the separating joint, extending substantially perpendicularly to the longitudinal direction, between the transmission housing and the clutch housing being displaced into the area of the transmission, and the forward end wall of the transmission housing as well as the forward portion thereof being formed by the clutch housing itself, the forward housing part formed by said bell-shaped clutch housing being also of double-walled construction and including longitudinal rib means extending from the forward end wall to the outer wall thereof, and connecting means for detachably connecting said clutch housing to the transmission housing and being accessible through the hollow spaces of at least some of said longitudinal means, and connecting means for detachably connecting said clutch housing to the transmission housing and being accessible from outside said outer wall means.

13. A housing made of light metal for gear transmissions, comprising:

inner and outer wall means forming a double-walled housing construction over at least three-quarters the length of the housing, longitudinal rib means arranged between the outer and inner wall means, the hollow spaces disposed between the longitudinal rib means and the outer and inner wall means being open at least toward one housing end face, and the outer wall means extending over about ¾ of the housing length while the longitudinal rib means extend over substantially the entire housing length and comprise a portion inclined from the end of the outer wall means to the respective housing end wall.

14. A housing made of light metal for gear transmissions, comprising:

inner and outer wall means forming a double-walled housing construction over at least three-quarters the length of the housing, longitudinal rib means arranged between the outer and inner wall means, the hollow spaces disposed between the longitudinal rib means and the outer and inner wall means being open at least toward one housing end face, and the outer wall means extending over about ¾ of the housing length while the longitudinal rib means extend over substantially the entire housing length and comprise a portion inclined from the end of the outer wall means to the respective housing end wall.

15. A change-speed gear housing made of light metal for gear transmissions, comprising:

inner and outer wall means made of light metal and forming a double-walled housing construction over at least three-quarters the length of the housing, longitudinal rib means made of light metal and arranged between the outer and inner wall means, and the hollow spaces disposed between the longitudinal rib means and the outer and inner wall means being open in the direction toward at least one housing end face.

16. A housing made of light metal for gear transmissions, especially for change-speed transmissions of motor vehicles of the type in which the transmission shafts are supported in housing end walls, comprising:

inner and outer wall means forming a double-walled transmission housing over at least three-quarters the length of the housing, longitudinal rib means arranged between the outer and inner wall means, the hollow spaces disposed between the longitudinal rib means and the outer and inner wall means being open at least toward one housing end face.

17. A housing made of light metal for gear transmissions, especially for change-speed transmissions of motor vehicles of the type in which the transmission shafts are supported in housing end walls, comprising:
- inner and outer wall means forming a double-walled transmission housing over at least three-quarters the length of the housing,
- longitudinal rib means arranged between the outer and inner wall means,
- the hollow spaces disposed between the longitudinal rib means and the outer and inner wall means being open at least toward one housing end face,
- and wall means forming bearing seats.

18. A housing made of light metal for gear transmissions, especially for change-speed transmissions of motor vehicles, comprising:
- inner and outer wall means forming a double-walled transmission housing of double-wall construction over at least three-quarters the length of the housing,
- longitudinal rib means arranged between the outer and inner wall means,
- the hollow spaces disposed between the longitudinal rib means and the outer and inner wall means being open at least toward one housing end face,
- and a bell-shaped clutch housing detachably connected to said transmission housing,
- the separating joint between said transmission housing being displaced within the area of the transmission so that said clutch housing forms itself one end part of the transmission housing as well as one end wall thereof.

19. A housing made of light metal for gear transmissions, especially for change-speed transmissions of motor vehicles, comprising:
- inner and outer wall means forming a double-walled transmission housing of double-wall construction over at least three-quarters the length of the housing,
- longitudinal rib means arranged between the outer and inner wall means,
- the hollow spaces disposed between the longitudinal rib means and the outer and inner wall means being open at least toward one housing end face,
- and a bell-shaped clutch housing detachably connected to said transmission housing,
- the separating joint between said transmission housing being displaced within the area of the transmission so that said clutch housing forms itself one end part of the transmission housing as well as one end wall thereof,
- said clutch housing being also of double-wall construction over at least a part of its length and including longitudinal rib means extending from said one end wall toward the outer wall means of the clutch housing.

References Cited by the Examiner

UNITED STATES PATENTS

| | | | |
|---|---|---|---|
| 1,009,702 | 11/1911 | Utz | 192—112 |
| 1,677,714 | 7/1928 | Frease | 165—141 |
| 2,361,190 | 10/1944 | Gerst | 192—112 |
| 2,855,068 | 10/1958 | Chapel | 181—61 |
| 3,076,346 | 2/1962 | Peterson | 74—606 |

FOREIGN PATENTS

| | | |
|---|---|---|
| 1,132,452 | 6/1962 | Germany. |
| 396,578 | 8/1933 | Great Britain. |

MILTON KAUFMAN, *Primary Examiner.*

BROUGHTON G. DURHAM, *Examiner.*

W. S. RATLIFF, *Assistant Examiner.*